Nov. 17, 1964  V. L. FRAZIER  3,157,412
SINGLE LEAF SPRING SUSPENSION
Filed Dec. 21, 1961  2 Sheets-Sheet 1

INVENTOR.
VAN L. FRAZIER
BY
ATTORNEYS

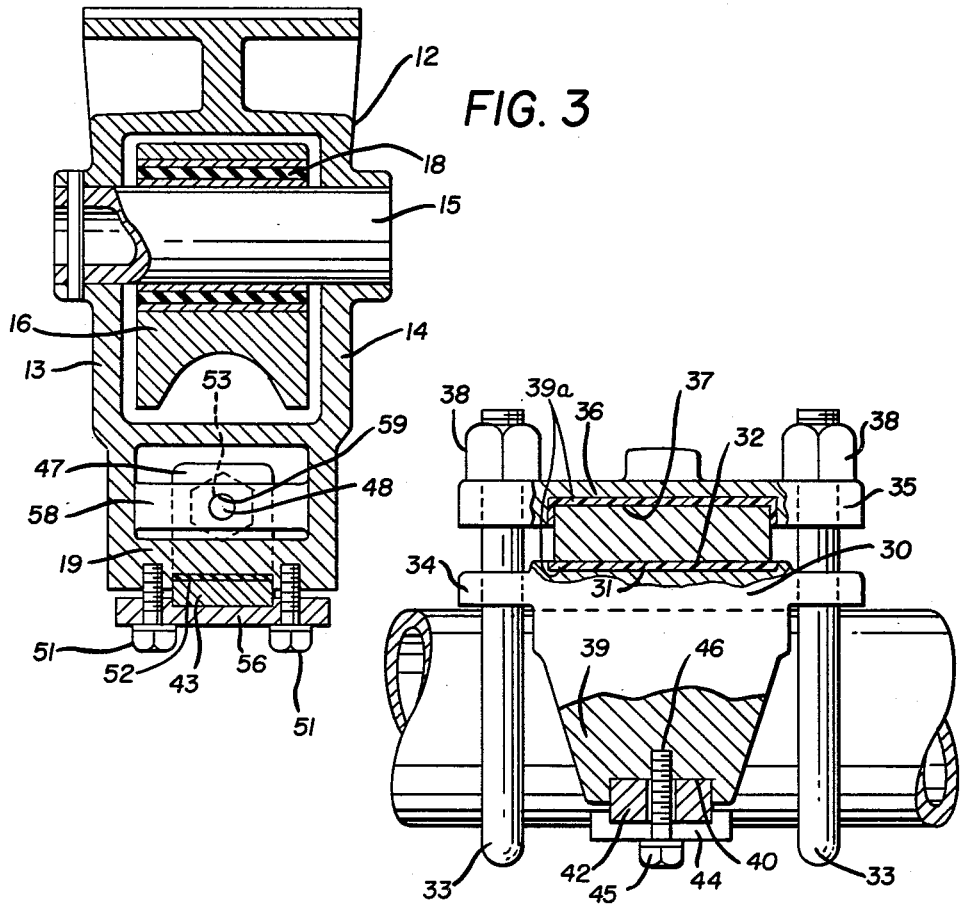
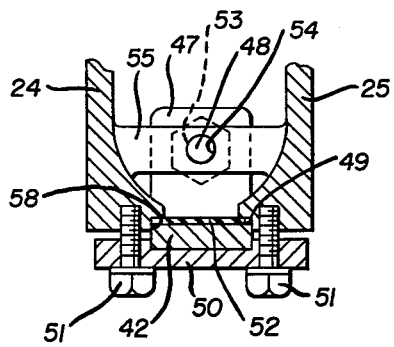

United States Patent Office 3,157,412
Patented Nov. 17, 1964

3,157,412
SINGLE LEAF SPRING SUSPENSION
Van L. Frazier, Dayton, Ohio, assignor to The Dayton Steel Foundry Company, Dayton, Ohio, a corporation of Ohio
Filed Dec. 21, 1961, Ser. No. 161,065
4 Claims. (Cl. 280—104.5)

The present invention relates to suspension systems for motor vehicles. More particularly, the present invention relates to suspension systems employing single leaf springs to support the axles.

Multiple leaf springs, although they are far more expensive than single leaf springs, have been employed almost exclusively because of the operational difficulties incident to single leaf springs. Specifically, single leaf springs are constructed with the greatest cross sectional area in the central portion. Outwardly of this central portion, and toward each end, the cross sectional area of the spring gradually diminishes. Structurally, this shape is ideal because the spring is, in effect, an end supported beam centrally loaded and, as such, the spring must be structurally designed to withstand the greatest shear load at the ends and the greatest bending moment in the central portion, the latter imposing the greatest stress to which the spring is subjected. Moreover, this outwardly diminishing cross section enhances the resiliency of the metal used and provides a theoretically excellent suspension means. However, the diminishing cross section is analogous to the reed on a wood wind musical instrument and has a similar propensity for reasonating. Because of this, a relatively minor road shock can initiate a harmonic vibration in a single leaf spring which will cause the ends of the spring to contraflex or "flip" out of contact with the spring seat. The resulting pounding imparted to the vehicle when the spring ends snap back into their seats produces an antipodal result to that demanded from an effective suspension system.

The interleaf friction precludes this flipping contraflexure in multiple leaf spring constructions. In single leaf constructions it has heretofore been thought possible to minimize contraflexure only by complex and expensive shock absorbing means interconnected between the frame and the axle.

It is therefore an object of the present invention to provide a vehicular suspension system employing single leaf springs, both in single and multiple axle systems, in such a manner that their ends will not flippingly contraflex.

It is a further object of the present invention to provide a stabilizing means to be used with a suspension system employing single leaf springs which prevents the ends of the spring from flipping contraflexure.

These and other objects of the invention, and further advantages hereof, will become apparent in the following specification and are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

In the drawings:

FIG. 3 is an enlarged cross section taken substantially on line 3—3 of FIG. 1;

FIG. 4 is an another sectional view looking to the rear the suspension system and taken substantially on line 4—4 of FIG. 1; and, FIG. 5 is still another sectional view looking to the front of the suspension system and taken substantially on line 5—5 of FIG. 1.

In general, suspension systems according to the present invention utilize a single leaf spring in combination with a springingly resilient stabilizing bar or rod interconnected between the frame and the central or medial portion of the spring, as for example, to a bolster pad rigidly connected to the spring. The use of a stabilizing rod as hereinafter set forth, in connection with the single leaf spring, eliminates the flipping contraflexure of the spring ends normally incident to single leaf spring constructions.

A suspension system according to the present invention is as readily adaptable to single as to dual axle arrangements, and when the system is understood with respect to either its application to the other will be immediately apparent. For example, one use for a suspension system according to the present invention would be on heavy duty over the road trailers which employ tandem axles in order to carry the greatest load possible and still remain within the maximum axle load limitations imposed by the various states. Suspension systems for tandem dual axles are employing, to an ever greater extent, independently sprung tandem springs which are interconnected by an equalizing means in order to distribute the load between the axles irrespective of the contour of the road surface over which the vehicle is traveling. Prior to the present invention these equalized suspension systems have been utilizing multiple leaf springs almost exclusively, with the majority being of the semielliptic type and the remainder of the straight type.

Figure 1:
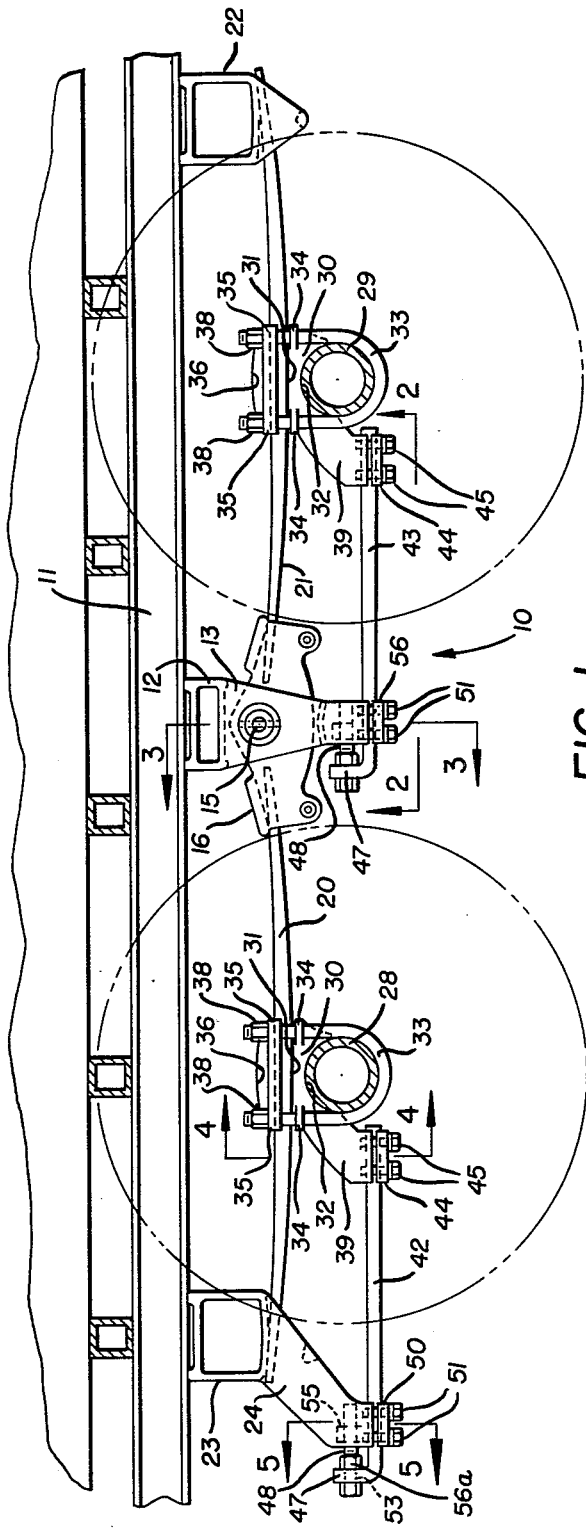
FIG. 1 is a longitudinal cross section through a dual axle suspension system showing tandem single leaf springs, according to the present invention, in side elevation.
Figure 2:
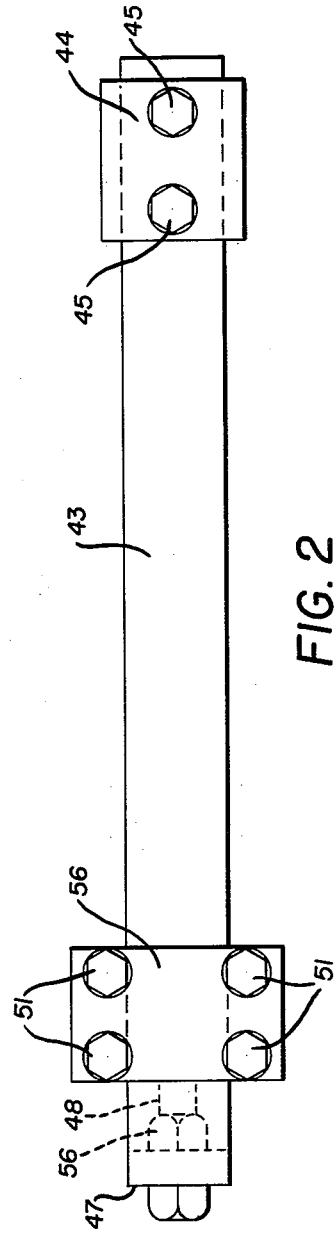
FIG. 2 is an enlarged fragmentary bottom elevation of the suspension system taken substantially on line 2—2 of FIG. 1.

In the tandem axle arrangement depicted in FIG. 1, the improved suspension is indicated generally by the numeral 10. A longitudinal side frame member supporting the bed of a trailer vehicle utilizing the suspension 10 is indicated generally at 11. An equalizer housing, or bracket, 12 is attached, as by welding, to the underside of frame member 11. As best shown in FIG. 3, the housing 12 has parallel side walls 13 and 14 between which extends an equalizer mounting shaft 15 on which a conventional oscillatable member or equalizer 16 is journaled. A suitable resilient bushing 18, as for example, one of torselastic construction is preferably disposed between the shaft 15 and the equalizer 16. The lower ends of side walls 13 and 14 are joined by a horizontally disposed base plate 19 which adds structural rigidity to the housing and constitutes a stabilizer seat, as described in detail below.

The adjacent ends of two tandem single leaf springs 20 and 21 are received in the forwardly and rearwardly extending ends of equalizer 16. The opposite end of the rear tandem spring 21 is received in a conventional hanger bracket 22 attached to the longitudinal frame member 11, as by welding. The opposite end of forward tandem spring 20 is received in a similarly attached hanger bracket 23. The forward bracket 23 has two downwardly and forwardly extending parallel side walls 24 and 25, the lower ends of which constitute a stabilizer seat, as described in detail below.

Beneath the medial portion of each of the springs 20 and 21 are secured the forward and rear transversely extending tandem axles indicated at 28 and 29, respectively. A spring chair or bolster pad 30 is interposed between each axle and its supporting single leaf spring so as to abut the convex lower surface 31 of the spring and provide an arcuate seat 32 to engage the upper surface of the respective axle. Each of the bolster pads 30 are fastened to the respective axles 28 and 29, by pairs of U bolts 33. The upwardly extending legs of each U bolt extend through ears 34 on the bolster pad 30 and continue through similar ears 35 provided on saddle 36. The spaced apart ears 35 define a saddle notch 37 contacting the upper concave surface of each leaf spring so that by tightening the nut 38 on each U bolt leg the axle is rigidly connected to the medial portion of the supporting spring. It has been found advantageous to position a liner 39a between the springs 20 and 21 and the bolster pad 30 as well as between springs 20 and 21 and the saddle 36 to prevent deleterious wear on the springs at their points of contact with their support. This liner can be effectively manufactured of nylon, plastic, fiber or other suitable material.

Each bolster pad 30 has a forwardly and downwardly extending leg portion 39 which provides a stabilizer seat 40. Although the preferred form shows the stabilizer seat 40 below the axis of the axle, any construction which provides a stabilizer seat which is connected to the spring would fulfill the requirements of the present concept so long as the resiliency of the stabilizer and its orientation causes it to dampen the resonance of its cooperating single leaf spring.

The stabilizer seat 40, as best seen in FIG. 4, comprises a shallowly recessed portion in the end of leg 39 which receives one end of the stabilizer 42 or 43. A recessed locking plate 44 engages the stablizer in opposition to the seat 40 and is secured by cap screws 45 which pass through plate 44 and the respective stabilizer 42 or 43 to be received in tapped bores 46 in the base of recessed seat 40. It should be understood that whereas the above construction is preferable, any means capable of securing the stabilizer to the seat 40 would be satisfactory.

The other end of each stabilizer 42 and 43 is turned upwardly into a hook 47 which is bored to receive a bolt 48.

As best seen in FIG. 5, side walls 24 and 25 of bracket 23 are provided with opposed shelves 49 on the interior surface of the walls and adjacent to lower extremities thereof. The stabilizer 42 rests on the forward seat formed by shelves 49 and may be secured thereagainst by a recessed locking plate 50 which is tightened against stabilizer 42 by a plurality of bolts 51, which are received in side walls 24 and 25 without engaging stabilizer 42. Rather than have the stabilizer directly engage shelves 49 a resilient cushion 52 may be interposed between them and the stabilizer to accommodate the variation of dimension between the axle and the seat as the axle oscillates up and down, without unduly affecting the damping action of the stabilizer.

The bore 53 in hook 47 registers with a tapped bore 54 in a vertically disposed anchor plate 55. Bore 54 thus receives bolt 48. A locking nut 56a mounted on bolt 48 between hook 47 and anchor plate 55 cooperates to permit preselected longitudinal orientation of stabilizer 42 in order to provide a means for axle alignment.

Base plate 19 between the lower extremities of side walls 13 and 14 of housing 12 is shallowly recessed to form a forward seat for stabilizer 43 which may be secured in the seat by a recessed locking plate 56 similar to locking plate 50. Of course a resilient cushion 52 may also be used with this seat. A vertically disclosed anchor plate 58 is positioned similarly to plate 55 so that the tapped bore 59 therein can receive the bolt 48 passing through registering bore 53 and hook 47. Stabilizer 43 is thus longitudinally oriented in the same manner as stabilizer 42 to align the rear axle 29.

The stabilizers 42 and 43 are both shown to be generally of a leaf springlike configuration. However, the exact cross section of either stablizer is not critical so long as they can flex with their respective axle. In fact, a circular cross section would be satisfactory. The resiliency of the stabilizer may slightly assist the spring in bearing the axle load, but that is an incidental function. The primary function of the stabilizer is to resiliently oppose the flexure of the single leaf spring. In this way the resonance of the single leaf spring is effectively dampened. It has been found that if the stablizers have a spring rate different from their cooperative single leaf supporting spring the harmonics which would otherwise be induced in the single leaf supporting spring are more effectively suppressed.

The combination of a single leaf spring with a stabilizer as disclosed above, also constitutes an effective single axle suspension. For example, if axle 28 were to constitute the single axle in such as suspension the end of spring 21 received in equalizer 16 would instead be received in a hanger, such as that indicated by the numeral 22.

Thus, single leaf springs can be employed in suspension systems adapted to support either single or dual axles and when used in conjunction with a springingly flexible stabilizer rod tensioned between the frame and the central portion of each spring, the resonance of the spring which normally results in contraflexure thereof is eliminated.

What is claimed is:

1. In a tandem suspension system for vehicles having tandem axles and vehicle frame members on each side of the vehicle; downwardly disposed spring hanger brackets mounted on said vehicle frame members, tandem single leaf springs on each side of said vehicle and disposed beneath said vehicle frame members, one end of each said single leaf spring slidably received in one of said spring hanger brackets, downwardly disposed equalizing means rockably connected to said vehicle frame members by equalizer hanger brackets, the other end of each said single leaf spring slidably received in said equalizing means, spring chairs connecting said axles to the medial portion of said springs, a forwardly and downwardly extending leg portion on each said spring chair, a stabilizer seat on the lower extremity of said leg portion, a stabilizer for each said single leaf spring, the rearward end of each said stabilizer secured to the seat on its respective spring chair, additional stabilizer seats secured to and extending downwardly from said frame members forwardly of and in paired relation with the stabilizer seats on said spring chairs, the forward end of each stabilizer seated in its respective additional seat, said stabilizers being vertically resilient to flex with the vertical oscillation of said single leaf spring at a different spring rate than said spring to dampen resonance and prevent flipping contraflexure thereof.

2. In a tandem suspension system for vehicles having tandem axles and axle load equalizing means; the combination, according to claim 1, wherein said stabilizer is of a generally leaf springlike configuration.

3. In a tandem suspension system for vehicles having tandem axles and axle load equalizing means; the combination, according to claim 1, in which the stabilizers are substantially parallel to the vehicle frame members and in which there are means on said stabilizers to adjust the longitudinal disposition of each said stabilizer to align the axles connected to the medial portions of said single leaf springs.

4. In a vehicular suspension system for a vehicle having frame members on each side of said vehicle, at least two single leaf springs disposed beneath said vehicle frame members, one on each side of said vehicle, downwardly disposed spring hanger means mounted on said vehicle frame members, spring seats on said hanger means for slidably receiving the ends of said single leaf springs, and an axle operatively connected to the medial portions of said single leaf springs, a first stabilizer seat for each said spring, means for mounting each said first stabilizer seat to the medial portion of its respective spring, a second stabilizer seat for each said spring disposed on one of said spring hanger means on substantially the same level as said first stabilizer seat, a stabilizer for each spring connected to said first and second stabilizer seats and extending between said medial portion and one end of said spring, said stabilizers adapted to flex with the vertical oscillation of said axle and at a different spring rate than said single leaf spring to dampen resonating vibration of each said spring and to prevent flipping contraflexure of the ends of said springs.

References Cited in the file of this patent

UNITED STATES PATENTS

| | | |
|---|---|---|
| 1,461,497 | Robbins | July 10, 1923 |
| 1,714,067 | Angelus | May 21, 1929 |
| 1,833,405 | Bock | Nov. 24, 1931 |
| 2,211,647 | Collier | Aug. 13, 1940 |
| 2,357,299 | Bagnall | Sept. 5, 1944 |
| 2,621,920 | Hogsten | Dec. 16, 1952 |
| 2,880,991 | Ward | Apr. 7, 1959 |